Nov. 17, 1970 D. P. SPAMPINATO ET AL 3,541,530
PULSED POWER FOUR DEVICE MEMORY CELL
Filed Jan. 15, 1968 2 Sheets-Sheet 1

INVENTORS
DOMINIC P. SPAMPINATO
LEWIS M. TERMAN

BY Thomas J. Kilgannon Jr.
ATTORNEY

PULSED POWER FOUR DEVICE MEMORY CELL

Filed Jan. 15, 1968 2 Sheets-Sheet 2

United States Patent Office 3,541,530
Patented Nov. 17, 1970

3,541,530

PULSED POWER FOUR DEVICE MEMORY CELL

Dominic P. Spampinato, Ozone Park, and Lewis M. Terman, South Salem, N.Y., assignors to International Business Machines Corporation, Armonk, N.Y., a corporation of New York Filed Jan. 15, 1968, Ser. No. 697,728
Int. Cl. G11c *11/40;* H03k *3/286*
U.S. Cl. 340—173 13 Claims

ABSTRACT OF THE DISCLOSURE

A memory cell consisting of four unipolar FET devices, two of which are connected in a cross-coupled flip-flop configuration and the remaining two of which are connected to the flip-flop devices and to the gate circuits of the flip-flop as switching devices is disclosed. The cell, in an npn configuration, stores information by simultaneously energizing one of two available bit lines and a word line with an appropriate pulse pattern. The word line is connected to the gates of the switching devices and writing is accomplished by pulsing the word line which turns on the switching devices, and by grounding the appropriate bit line. When the word drive is removed, the switching devices turn off. The state of the flip-flop is retained by charge storage on the gate of the ON portion of the flip-flop. Charge, which slowly leaks off through the OFF portion of the flip-flop, is periodically restored by pulsing the word line. Reading, also accomplished by pulsing the word line, causes current to flow through the ON portion of the flip-flop which is sensed in a detector coupled to a separate sense line or coupled to a switchable bit-sense line. Charge restoration may be accomplished during a separate time period but each reading cycle also accomplishes charge restoration. A plurality of individual cells in array form to make up a memory arrangement which is read out nondestructively is also disclosed.

BACKGROUND OF THE INVENTION

Field of the invention

This invention relates generally to memory devices and to their method of operation. More specifically, it relates to an improved stored charge FET memory cell which uses intermittent charge restoration to minimize stand-by power consumption and to eliminate power sources normally required. The resulting cell permits extremely low power operation, has small lay-out area because the number of unipolar devices required is reduced and large sense currents are obtained. Also, reading is accomplished nondestructively.

Description of the prior art

Devices which store electrical energy in various forms have been known for a number of years and, since the discovery of the field effect transistor (FET), a number of circuits have been disclosed which take advantage of the ability of the FET to store charge and act as a memory cell in arrangements which are built around a basic flip-flop configuration. All of the known arrangements utilize anywhere from six to eight FET devices in conjunction with other circuit elements. The common factor in all the prior art devices is the utilization of a circuit, when the cell is in a quiescent state, which maintains the charge on the gate capacitance of the ON device of the flip-flop. This circuit provides a current to compensate for the leakage of charge from the gate capacitance of the ON device of the flip-flop. The currents supplied are usually very small and dissipation is usually in the order of milliwatts but, when one considers a megabit memory, dissipation of even one milliwatt per cell results in a total power consumption of one-kilowatt. Power consumptions of this magnitude result in design requirements which incorporate active cooling and larger sizes of elements to permit heat dissipation. All this has nothing to do with the activation of the cells in their read and write modes but is requred for the sole purpose of maintaining the state of the flip-flops of the individual cells in a previously set state.

One such circuit, incorporating high resistance load resistors coupled to a D.C. source for charge maintenance is shown in the IBM Technical Disclosure Bulletin, vol. 8, No. 12, May 1966, p. 1838. While the cell shown has low power consumption, it has the disadvantage that large areas of a chip are required to obtain high values of resistance which are required to limit dissipation. As indicated hereinabove, such arrangements, while suitable in memory arrangements of small to medium capacity, are not particularly desirable where power consumption, heat dissipation, small size and large numbers of cells are design considerations.

SUMMARY OF THE INVENTION

The apparatus of the present invention, in its broadest aspect, comprises a memory cell which consists of two FET device connected in a cross-coupled configuration (with the drain of one FET connected to the gate of the other FET and the drain of the other FET connected to the gate of the first mentioned FET). Switching FET's, the gates of which are connected to a word line and the drains of which are connected to bit sense lines, are connected in series with the FET's of the flip-flop. Pulsed sources are coupled to the bit-sense lines and to the word lines to apply an appropriate pulse pattern for writing into the cell and for nondestructively reading stored information out of the cell. A pulsed source for restoring charge to the ON FET of the flip-flop, which may be integral with the pulse source coupled to the word line, is also utilized.

The method of the present invention, in its broadest aspect, incorporates the steps of applying a pulse through a switching device which has been turned on by application of a pulse to an enabling gate during a writing period, to store information in a flip-flop, and applying a pulse to the same enabling gate during a reading period to read the state of the flip-flop. The method further includes the step of applying a pulse to the enabling gate during a period different from the reading and writing periods to restore charge on the ON portion of the flip-flop.

In accordance with a more specific aspect of the invention, two FET devices (n-channel enhancement mode) are serially connected and disposed in parallel with a like pair of serially connected FET devices. The sources of a pair of the FET's are grounded while their drains are cross-connected to the gate of the opposing FET to form a well-known flip-flop or bi-stable circuit arrangement. The drains are each connected in series with another FET which has a transconductance (*gm*) lower than the transconductance of the FET's connected in the flip-flop configuration. In the preferred arrangements, the *gm* of the flip-flop FET's should be equal to or greater than the *gm* of the switching or load FET's. The gates of the switching FET's are connected to a pulsed source over a word line connection while the drains are connected in series with pulsed sources over a bit line connection. A pulse pattern consisting of a positive pulse on the word line which enables the switching of load FET's and a grounding of one of the bit lines of the memory cells causes the state of the flip-flop to be set. Reading is accomplished by applying a positive pulse to the word line causing current to flow through the ON portion of the flip-flop and the related bit-sense line. The resulting current flow is detected in an appropriate sense detector.

Quiescently, there is no current flow in the cells other than that due to leakage, therefore, the state of the flip-flop must be maintained so that the information is not lost due to this leakage. This is accomplished by periodically pulsing the word line at times different from the reading and writing periods. The effect of this pulsing is to restore charge on the gate capacitance of the ON FET device of the flip-flop. When the FET switching devices are OFF, dissipation in the cell is virtually zero and all the advantages resulting from this fact are attained as outlined hereinabove.

It is, therefore, an object of this invention to provide a memory cell which requires no separate power supply to maintain stored charge.

Another object is to provide a memory cell with greatly reduced standby-power requirement.

Another object is to provide a memory cell which requires a maximum of four FET devices, a single word line connection, two common bit-sense lines and a ground connection.

Another object is to provide a method of operation which greatly reduces the power requirements over that needed by prior art memory cells.

The foregoing and other objects, features and advantages of the invention will be apparent from the following more particular description of a preferred embodiment and method of operation of the invention as illustrated in the accompanying drawings.

DESCRIPTION OF THE PREFERRED EMBODIMENT

Figure 1:
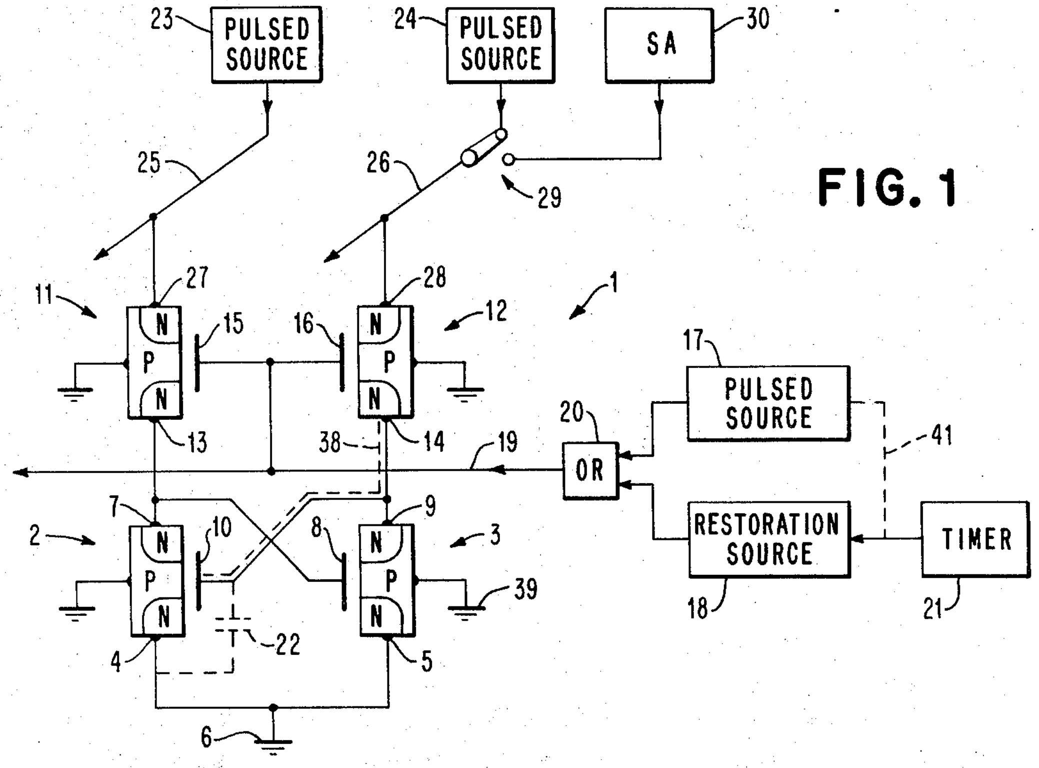
FIG. 1 is a schematic diagram of a memory cell in accordance with the present invention showing the various pulsed sources required for writing, reading and charge restoration.

Referring now to FIG. 1, a memory cell in accordance with the present invention is shown generally at 1. Memory cell 1 consists of four field effect transistors of the npn, enhancement mode type in this illustrative embodiment. Enhancement mode devices are normally off, that is, no current flows from source to drain unless a voltage greater than the threshold, and of the proper polarity, is applied to the gate. The conditions for operation of enhancement mode devices will become apparent in the following discussion of the circuit of memory cell 1 and its method of operation.

In FIG. 1, two identical field effect transistors (hereinafter called FET's) 2, 3 are shown schematically with their sources 4, 5 connected to a common ground 6. The drain 7 of FET 2 is shown connected to gate 8 of FET 3 and drain 9 of FET 3 is shown connected to the gate 10 of FET 2. A circuit arranged in the configuration just described is a typical bi-stable circuit or flip-flop well known to those skilled in the semiconductor circuit art.

Connected in series with FET's 2, 3 are switching FET's 11, 12, respectively. FET's 11, 12 are substantially identical but differ from FET's 2, 3 in that their transconductance (*gm*) is equal to or lower than the transconductance of identical FET's 2, 3. The reason for this will become apparent when the mode of operation of the circuit is discussed in what follows. Thus, the drains 7, 9 of FET's 2, 3, respectively, are connected to sources 13, 14 of FET's 11, 12, respectively. Gates 15, 16 of FET's 11, 12, respectively, are shown connected in parallel in FIG. 1 and are connected to sources 17, 18 via word line 19 and OR gate 20. Restoration source 18 is shown connected to a timer 21 which energizes source 18 periodically to accomplish restoration of charge which will have leaked from the gate capacitance of the ON device of the flip-flop.

Assuming FET device 2 to be in the ON state, charge is stored in the gate capacitance as represented by the dotted capacitor 22 interconnected between gate 10 and source 4 of FET 2. The object is to cause restoration of charge lost through leakage so that the output of the ON portion of the flip-flop will be of sufficient amplitude during a read cycle to activate a sense amplifier which detects the state of the flip-flop. In FIG. 1, pulsed sources 23, 24 are shown connected via bit-sense lines 25, 26 to the drains 27, 28 of FET's 11, 12, respectively. A switch 29 is shown interposed in bit-sense line 26 which interconnects pulsed source 24 with FET 12 in one position and, in its other position, interconnects FET 12 with a sense amplifier 30. Sense amplifier 30 responds to the flow of current through the ON FET of the flip-flop and the serially disposed switching FET's when the latter are energized, during a reading period from pulsed source 17. At all other times, bit-sense line 26 is connected to pulsed source 24 which is either energized or not energized during a writing period to change the state of memory cell 1.

Figure 2:
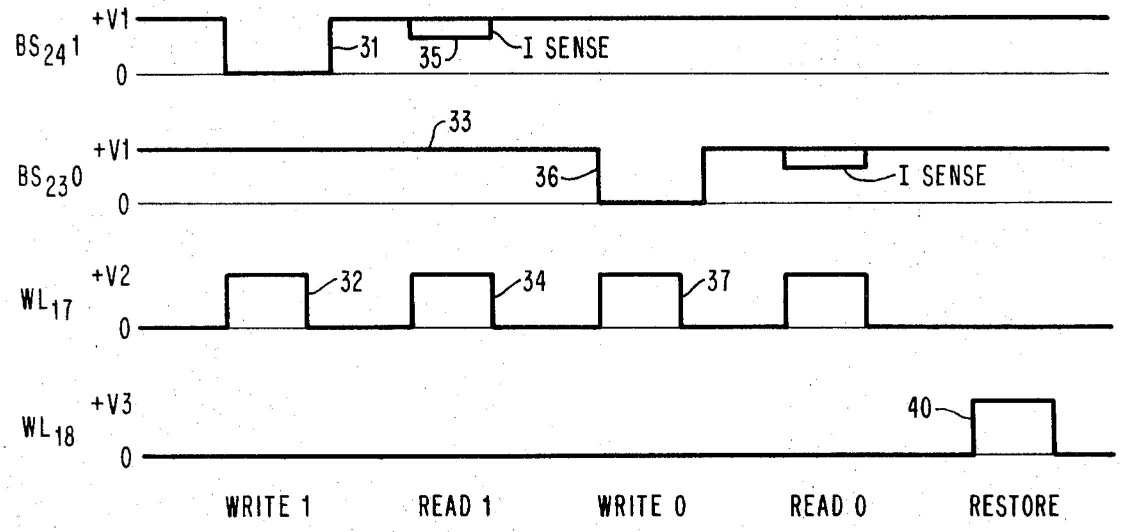
FIG. 2 is a representation of the voltage and current pulse patterns applied and obtained during writing, reading and charge restoration.

Writing, reading and charge restoration of memory cell 1 of FIG. 1 is accomplished using the pulse patterns shown in FIG. 2 during respective writing, reading and charge restoration periods. For purposes of this disclosure, the reading and writing periods are considered as periods when memory cell 1 is in an active state and the remaining periods are considered as periods when memory cell 1 is in a quiescent state. Thus, restoration takes place by pulsing word line 19 of cell 1 when the cell is in a quiescent state.

Assuming, for purposes of illustration, that FET 2 is in the ON state from a previous pulse pattern and that it is desired to change the state of the flip-flop, the following mode of operation is utilized.

Changing the state of the flip-flop is a write operation and this is accomplished by changing the voltage to the bit-sense line which is connected to the FET in series with the FET of the flip-flop which is to be turned ON. At the same time, a voltage is applied via the word line to turn ON the switching FET's.

Thus, in FIG. 1, with FET 2 in the ON state, gate 8 effectively "sees" zero volts thereby maintaining FET 3 in the OFF state. At this point, voltages are simultaneously applied via word line 19 from pulsed source 17 to gates 15, 16 of FET's 11, 12, respectively, and to drain 28 of FET 12 from pulsed source 24 via bit-sense line 26. The pulse pattern applied to memory cell 1 is shown in FIG. 2. On bit-sense line 26, the voltage is dropped from some positive voltage to ground and, shown in FIG. 2 as pulse 31. On word line 19, the voltage is raised from ground to some positive value and is shown in FIG. 2 as pulse 32. The effect of the latter pulse on memory cell 1 is to turn on or cause conduction in FET's 11 and 12. The application of pulse 31 to drain 28 FET 12, which is now turned on, insures that zero volts will appear at drain 9 of FET 3. Zero volts then appear on gate 10 of FET 2 turning that device to the OFF state. At the same time, it should be appreciated that some positive voltage $V_1$ is being maintained on drain 27 of FET 11. This voltage is shown at 33 in FIG. 2. When FET 11 is turned on by pulse 32, voltage $V_1$ appears at drain 7 of FET 2 (which has just been turned off by the application of zero volts on gate 10) and consequently at gate 8 of FET 3, turning this device to the ON state. The removal of pulse 32 from word line 19 turns off FET's 11, 12 and voltages on the bit-sense lines 25, 26 are both at positive voltage $V_1$. Memory cell 1 has been switched and the formerly OFF FET 3 is now in the ON state.

To determine the state of the memory cell, reading is undertaken by applying only a positive voltage to word line 19 from pulsed source 17. This pulse, shown at 34 in FIG. 2, turns on FET's 11, 12 which, in conjunction with ON FET 3, causes current to flow through these devices and in either bit-sense line 25 or 26. Current flow, represented by pulse 35 in FIG. 2, is sensed in sense amplified 30 which is electrically coupled to bit-sense line 26 by the actuation of switch 29. The turning-on of FET 11 by pulse 34 also has the effect of applying a voltage $V_1$, shown as 33 in FIG. 2, to gate 8 of FET 3 thereby bringing the charge up to the maximum level attainable provided the pulse on the word line is maintained for a sufficient time. Restoration of charge is, therefore, obtained during the reading period.

Switching FET 2 to the ON state is accomplished in substantially the same manner as described above in connection with switching FET 3 to the ON state with the exception that a pulse from pulsed source 23 is applied via bit-sense line 25 to FET 11. Pulses 36, 37, as shown in FIG. 2, are applied from pulsed sources 23 and 17, respectively.

In FIG. 2, it should be noted that the voltages applied to each of the bit lines 25, 26 are held, during switching at the desired voltage levels for a longer period of time than the time at which the voltage level on word line 19 is held during switching. This is done to make certain that gates 8, 10 of FET's 3, 2, respectively, are not exposed to a changing voltage before FET's 11, 12 are turned off by removal of voltage from word line 19.

As noted hereinabove, restoration of charge is accomplished during the reading period using the above described memory cell. It is, however, not uncommon to set the state of a memory cell and not read out the information for a considerable period of time. In memory cell 1, for example, assuming FET 2 is in the ON state and that charge is stored on capacitor 22, a leakage path (shown by dashed line 38) exists which passes from the gate 10 via a cross connection to drain 9 of FET 3 (which is now assumed to be OFF) to ground 39 by way of the pn junction from in FET devices of this type by diffusing an n-conductivity type dopant into a p-conductivity type substrate. A similar leakage path exists through FET 12. It should be clear at this point that conditions can be envisaged where reading of a memory is not undertaken until some time after the stored charge has leaked off resulting in loss of the information stored. Such destruction of information cannot be tolerated so restoration of charge must be accomplished before total leakage of charge occurs. This is accomplished in memory cell 1 by activating restoration source 18 which, under control of timer 21, periodically or intermittently applies a positive voltage via OR gate 20 to word line 19 which is applied to gates 15, 16 of FET's 11, 12, respectively. Charge is then restored to the gate of the ON FET in the same manner as if reading were being undertaken. Of course, during charge restoration, sense amplifier 30 should be disconnected from line 26 so that a signal is not read out. Providing a signal during what is normally the quiescent state of memory cell 1 might disrupt the operation of a system in which a memory is usually incorporated. Pulse 40 in FIG. 2 shows that restoration takes place at a time different from the reading and writing period.

Alternatively, timer 21 may be connected directly to pulsed source 17 (via dotted connection line 41 in FIG. 1) to periodically activate pulse source 17 regardless of when source 17 was last activated. All the pulsed sources in FIG. 1 are activated by externally derived trigger pulses which are applied under control of a programmed source in a well-known manner. Since such activation forms no part of the present invention, the details are not necessary in practicing the present invention.

It has been indicated hereinabove that the serially connected switching FET and the flip-flop FET must have different transconductances. Specifically, the *gm* of the flip-flop devices must be higher than the *gm* of the switching FET's. This means that the switching FET must present a higher impedance. Under such conditions, when a restoring pulse is applied, the greater voltage drop occurs across the switching FET, thereby insuring that a voltage is not applied to the gate of the OFF FET which is in excess of the threshold voltage of that device. Exceeding the threshold of the OFF FET would turn that device ON and destroy the storage capability of the cell. In this connection, an experimental circuit was tested which utilized FET's available from Raytheon under the designation FN–1024. The FET's were tested to obtain pairs of devices having substantially the same values of transconductance. The flip-flop FET's utilized had a transconductance of approximately $6000\mu$ mhos while the switching FET's had a transconductance of approximately $1500\mu$ mhos. In operation, the experimental circuit required a positive amplitude excursion of 14 volts on the word line, while an excursion from a positive 6 volts to ground was required on the bit-sense lines. During charge restoration, the same positive 14 volt excursion is applied to the word line at periodic or intermittent intervals. The application of a charge restoration pulse to the word line every 10 milliseconds was found to be convenient. Longer or shorter times between restoration pulses may be utilized which are somewhat dependent on the parameters of the circuit elements involved.

Returning to FIG. 1, only a single sense amplifier 30 is shown connected to bit-sense line 26 via switch 29. It should be understood that a sense amplifier similar to amplifier 30 could be connected to bit-sense line 25 in the same manner as amplifier 30 is connected to bit-sense line 26. The present arrangement merely halves the number of sense amplifiers required without affecting the overall operation of the circuit since the lack of an output current on a bit-sense line is just as significant as an output on a bit-sense line. It should be appreciated, however, that a differential amplifier, well known to those skilled in the electronics art, connected to the bit-sense lines of a memory cell may be utilized. The advantage of such an arrangement is that noise cancellation is obtained.

Figure 3:
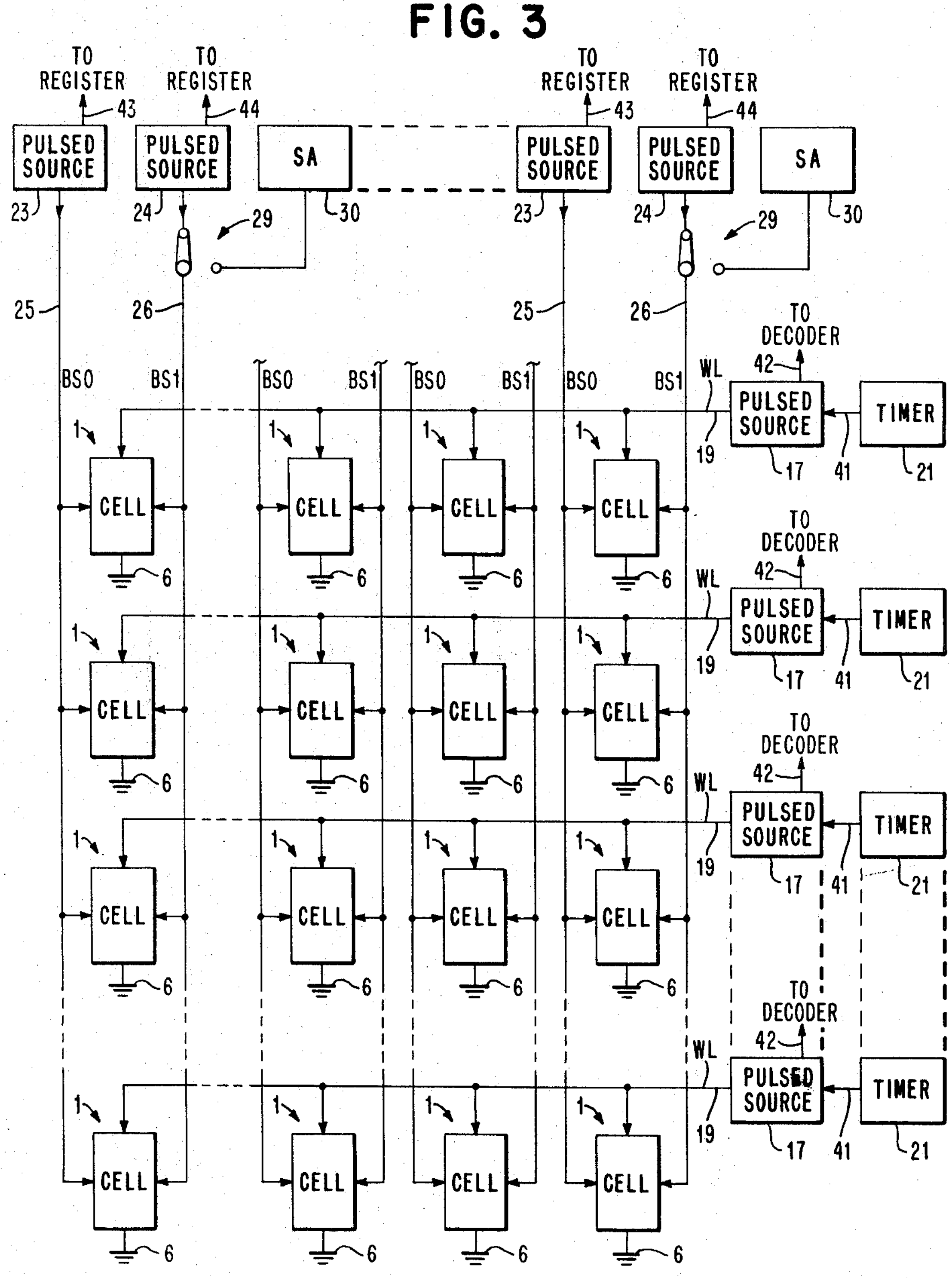
FIG. 3 is a schematic diagram of a plurality of cells of FIG. 1 connected in array form to show the operation of memory cells in a typical memory environment.

Referring now to FIG. 3, a schematic diagram of a plurality of cells of FIG. 1 is shown connected in array form to show the operation of memory cells in a typical memory environment. The reference numbers used in FIG. 1 are applied to the corresponding elements in FIG. 3 and memory cell 1 is shown, for purposes of simplification, as a "black box" with the required connections electrically coupling the circuit arrangement of FIG. 1 internally of the "black box."

In FIG. 3, a plurality of memory cells 1 are shown disposed in rows and columns to form an array which may have any number of bit positions in accordance with given design requirements. A bit position corresponds to a memory cell and a number of bit positions or cells associated with the same word line make up or store a word. As shown in connection with FIG. 1, memory cell 1, can be selectively energized to assume one of its two possible states thereby storing information in binary form.

In FIG. 3, each of the memory cells 1 in any column is connected via bit lines 25, 26 to pulsed sources 23, 24, respectively, during a write period and bit line 26 is connected via switch 29 to a sense amplifier 30 during a read period. Sense line 26 is designated in FIG. 3 as BS 1 indicating that information stored by way of line 26, when activated, is representative of a binary one while sense line 25 is designated as BS 0 indicating that information stored by way of bit line 26, when activated, is representative of a binary zero.

Pulsed sources 17 are shown in FIG. 3 connected by way of word lines 19 to a plurality of rows of memory cells 1, each row containing a plurality of memory cells 1. Pulsed sources 17 are energized from a plurality of timers via connection 41 or from a decoder (not shown) via connections 42 which selects only one of word lines 19 when information is to be written into or read from memory cells 1 associated with that one word line. When a word of information is to be stored, one of the pulsed sources 23, 24 is simultaneously energized along with a single pulsed source 17 from a register or the like (not shown) via connections 43 or 44, respectively.

To read information into the top row of cells 1, pulsed source 17 associated with the top row is energized and, at the same time, some combination of pulsed sources 23 or 24 are energized to write binary ones or zeros into each of the memory cells 1 of the top row. If all the cells of the top row are to assume a binary one state, pulsed sources 24 are energized and information is applied over lines 26 (further designated as BS 1) simultaneously with the energization of the word line 19 of the top row. When the cells 1 of the top row are to assume a binary zero state, they are energized from pulsed sources 23 via bit lines 25 (further designated as BS 0) simultaneously with the energization of word line 19 of the top row from its associated source 17. The information placed in cells 1 of the top row could have been stored in any other row by simply energizing pulsed source 17 associated with that row rather than the source 17 associated with the top row. To read out information stored in the cells 1 of any row, the cells 1 of that row are energized from the source 17 associated with that row over its word line 19 and current flow or no current flow is detected in each of the sense amplifiers 30 depending on the state of each individual cell. To accomplish restoration of charge in each of cells 1, timers 21 associated with pulsed sources 17 energize sources 17 and, energy is fed to each of the cells via word lines 19. Each of the cells 1 is written into, read from and restored in the same manner described in connection with FIG. 1.

While the present invention has been described in connection with npn or n-channel enhancement mode FET devices, it should be appreciated that pnp or p-channel enhancement mode FET devices can also be used. When the latter are used, the polarity of the pulse patterns shown in FIG. 2 is reversed. Thus, pulses 31 and 36 instead of going from a positive V1 to zero, go from a negative V1 to zero and, pulses 32, 34, 37 and 40 instead of going from zero to a positive V2 or V3 go from zero to a negative V2 or V3. Also, depletion mode npn or pnp FET's may be utilized by the simple expedient of applying a substrate voltage suffiicent to convert the depletion mode FET's to enhancement mode operation.

While the embodiment disclosed hereinabove has been restricted to the use of unipolar or FET devices, it should be appreciated that bi-polar devices can be substituted for the unipolar devices without departing from the teaching of the present invention. Thus, in FIG. 1, bi-polar transistors may be substituted for FET's 2, 3 in the following way: The emitters of the bi-polar devices are connected to ground 6; the bases of each of the bi-polar devices are cross-coupled to the collectors of opposing devices. Bi-polar devices may be substituted for FET's 11, 12 in the following way: The emitters of each of the bi-polar devices are connected to the collectors of the transistors of the flip-flop; the collectors are each connected to a bit line and the bases are connected to a common word line.

The bi-polar devices used should be substantially symmetric so that bi-direction conduction can take place. Also, the $\beta$ (beta) of the load bi-polar devices should be so controlled that during the reading period the voltage applied to the base of the OFF flip-flop transistor does not exceed a value which would turn the OFF transistor ON thereby destroying the information stored. This criterion must be adhered to in both bi-polar and unipolar schemes to insure nondestructive read-out of stored information.

What has been disclosed is a memory cell, in which the need for separate load devices and power sources have been eliminated with a resulting improvement in power dissipation, memory operation and cell lay-out area.

A method of operation has also been disclosed which, in conjunction with the circuit disclosed, permits the attainment of the above cited improvements.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A memory cell having an active and a quiescent state comprising:

a bistable circuit, means electrically coupled to said bistable circuit for setting said bistable circuit in one of a first and second condition, means electrically coupled to said bistable circuit for detecting said one of a first and second condition during said active state and a pulsed source only electrically coupled to said bistable circuit for restoring said bistable circuit in said one of a first and second condition during said quiescent state.

2. A memory cell according to claim 1 wherein said bistable circuit comprises: first and second transistors connected in parallel, an electrode of said first transistor being cross-coupled to a different electrode on said second transistor and an electrode of said second transistor corresponding to said an electrode of said first transistor being cross-coupled to a different electrode of said first transistor said last mentioned electrode corresponding to said different electrode of said second transistor.

3. A memory cell according to claim 2 wherein said transistors are field effect transistors, said an electrode of said first and second transistors is a gate electrode and said different electrode of said first and second transistors is a drain electrode.

4. A memory cell according to claim 2 wherein said transistors are bi-polar transistors, said an electrode of said first and second transistors is a base electrode and said different electrode of said first and second transistors is a collector electrode.

5. A memory cell according to claim 2 wherein said bistable circuit further includes, an actuable transistor connected in series with each of said first and second transistors, a corresponding electrode of each of said transistors being interconnected.

6. A memory cell according to claim 5 wherein said actuable transistors are field effect transistors the gate electrodes of which are interconnected.

7. A memory cell according to claim 5 wherein said actuable transistors are bi-polar transistors the bases of which are interconnected.

8. A memory cell according to claim 1 wherein said means for setting said bistable circuit during an active state includes, first and second bit lines connected to said bistable circuit, a word line connected to said bistable circuit and a plurality of pulsed sources one of which is connected to said word line and others of which are connected to said first and second bit lines, said pulsed source connected to said word line and one of said pulsed sources connected to said bit lines being energized simultaneously to set said bistable circuit.

9. A memory cell according to claim 1 wherein said means for detecting said one of a first and second condition includes a sense amplifier electrically connected to said bistable circuit and switching means interposed between said sense amplifier and said bistable circuit for interconnecting said sense amplifier to said bistable circuit during at least a portion of said active state.

10. A memory cell according to claim 1 wherein said means for restoring said bistable circuit during said quiescent state includes a pulsed source operable during both said active and quiescent states and, means connected to said pulsed source for activating said pulsed source only during said quiescent state.

11. A memory cell according to claim 10 wherein said means for activating said pulsed source includes a timer.

12. A memory cell having an active and a quiescent state comprising:

first and second pairs of FET devices only, said first pair of FET devices having substantially the same electrical characteristics, one electrode of each being connected to a common potential, another electrode of each being connected to the gate electrode of the other, said second pair of FET devices having substantially the same electrical characteristics but different from the electrical characteristics of said first pair of FET devices, one of said second pair of FET devices being connected in series with one of said first pair of FET devices and the other of said second pair of FET devices being connected in series with the other of said first pair of FET devices each of said second pair having source, drain and gate electrodes, a word line connected to the gate electrodes of said second pair of FET devices, first and second bit lines serially connected to one and the other, respectively, of said second pair of FET devices, first and second and third pulsed sources connected to said first and second bit lines and said word line, respectively, one of said first and second sources and said third sources being operable simultaneously to set said memory cell during said active state, and timing means for activating said third pulsed source coupled to said third pulsed source for restoring charge lost due to leakage from said cell during said quiescent state.

13. A memory cell having an active and a quiescent state comprising:

four semiconductor devices only, two of which are connected in a bistable circuit configuration, means including the remaining two semiconductor devices electrically coupled to said bistable circuit for setting the state of said circuit, means electrically coupled to said bistable circuit for detecting the state of said bistable circuit, and a pulsed source only connected to said bistable circuit for restoring the state of said bistable circuit during said quiescent state.

References Cited

UNITED STATES PATENTS

| | | | |
|---|---|---|---|
| 3,309,534 | 3/1967 | Yu. | |
| 3,321,639 | 5/1967 | Fowler | 307—291 |
| 3,390,382 | 6/1968 | Igarashi | 340—173 |

OTHER REFERENCES

Pleshko: Field-Effect Memory Cell with Low Standby Power . . . , IBM Technical Disclosure Bulletin, vol. 8, No. 12, May 1966, pp. 1838–9.

Feth: Memory Cell with Low Standby Power, IBM Technical Disclosure Bulletin, vol. 9, No. 4, September 1966, pp. 420–421.

TERRELL W. FEARS, Primary Examiner

U.S. Cl. X.R.

307—238, 279